United States Patent [19]

Grove et al.

[11] 4,091,840
[45] May 30, 1978

[54] FLOW DISTRIBUTING SYSTEM

[75] Inventors: Marvin H. Grove, Houston; Ronald G. Dunegan, Katy, both of Tex.

[73] Assignee: Daniel Valve Company, Houston, Tex.

[21] Appl. No.: 718,604

[22] Filed: Aug. 30, 1976

Related U.S. Application Data

[63] Continuation-in-part of Ser. No. 695,071, June 11, 1976, abandoned, and Ser. No. 549,180, Feb. 12, 1975, Pat. No. 3,978,707, and Ser. No. 652,998, Jan. 28, 1976.

[51] Int. Cl.² ............................................. F16K 11/00
[52] U.S. Cl. .............................. 137/561 R; 137/861; 137/343; 137/269
[58] Field of Search .................. 137/561 R, 608, 363, 137/372, 269, 271, 343, 861; 73/3; 417/234

[56] References Cited

U.S. PATENT DOCUMENTS

| | | | |
|---|---|---|---|
| 2,811,925 | 11/1957 | Crookston | 417/234 X |
| 2,951,498 | 9/1960 | Carver | 137/343 |
| 3,423,988 | 1/1969 | Grove et al. | 73/3 |
| 3,589,387 | 6/1971 | Raymond | 137/608 |
| 3,877,287 | 4/1975 | Duntz, Jr. | 73/3 |
| 3,955,796 | 5/1976 | Grove | 251/172 |

OTHER PUBLICATIONS

Bulletin No. AM-102, Mand J Valve Company, published 1966, pp. 6 and 7.

Primary Examiner—William R. Cline
Attorney, Agent, or Firm—James L. Jackson

[57] ABSTRACT

An assembly of pipes and flow control means (e.g., valves) carried by a supporting frame (e.g., a skid) and forming a modular unit for field assembly of flow distributing or diverting systems of the type used in the petroleum industry in connection with tank farms. The piping of each assembly unit has ends for coupling with associated piping and like associated assembly units, with the ends disposed in vertical planes that are coincident with the corresponding sides of the frame, thereby facilitating field assembly of the units to form a desired overall system.

5 Claims, 12 Drawing Figures

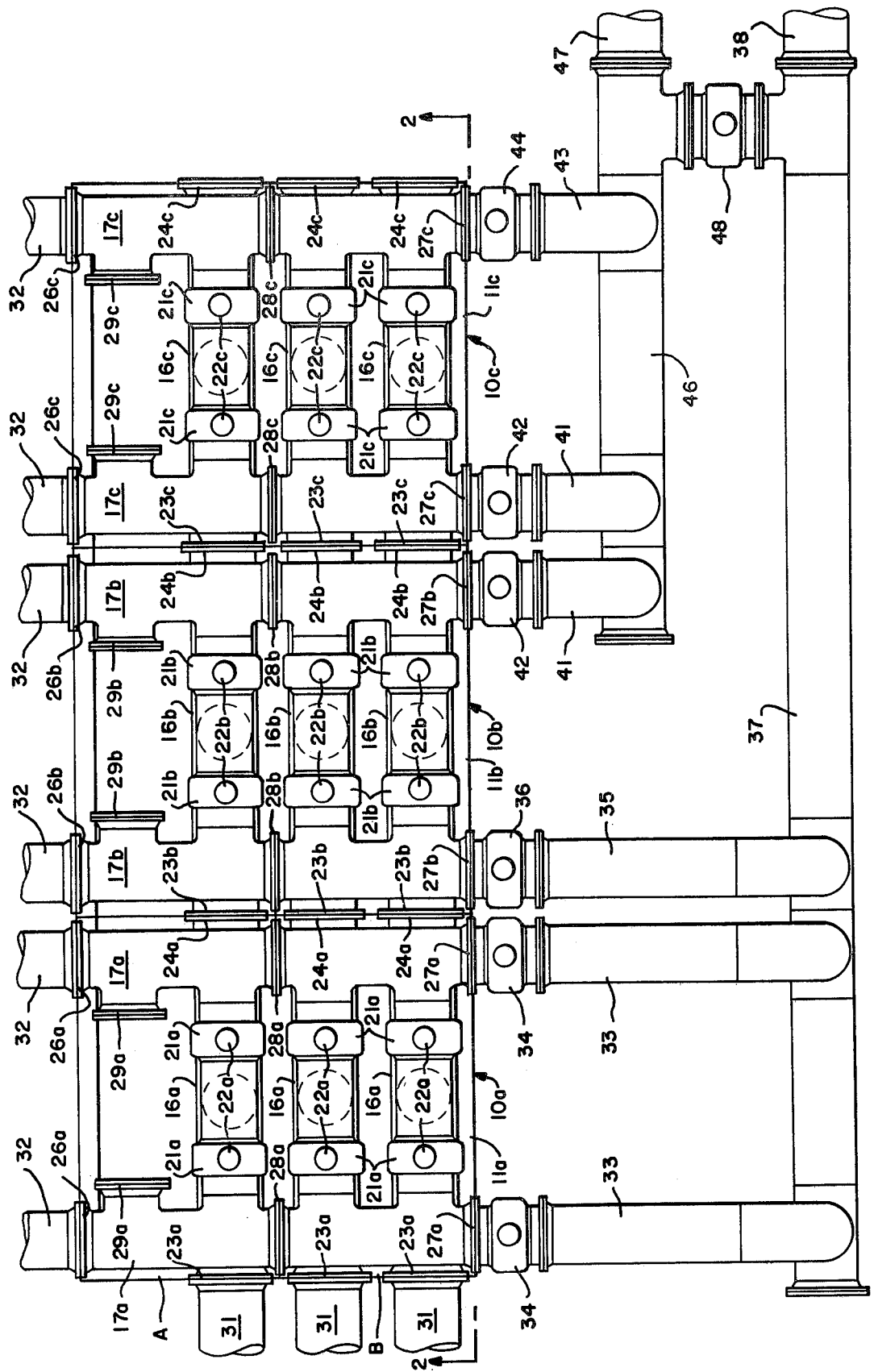
FIG. — 1

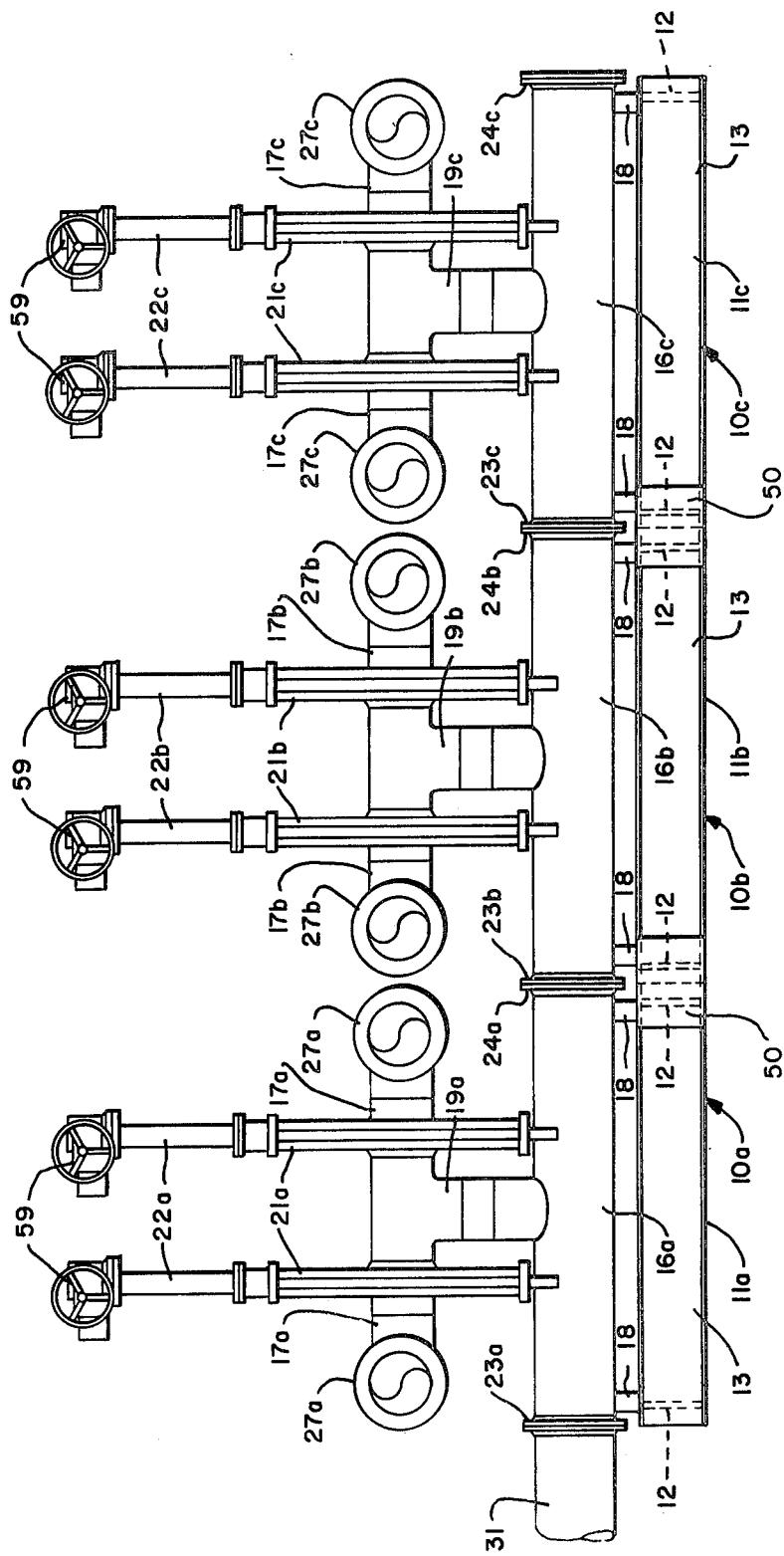
FIG.—2

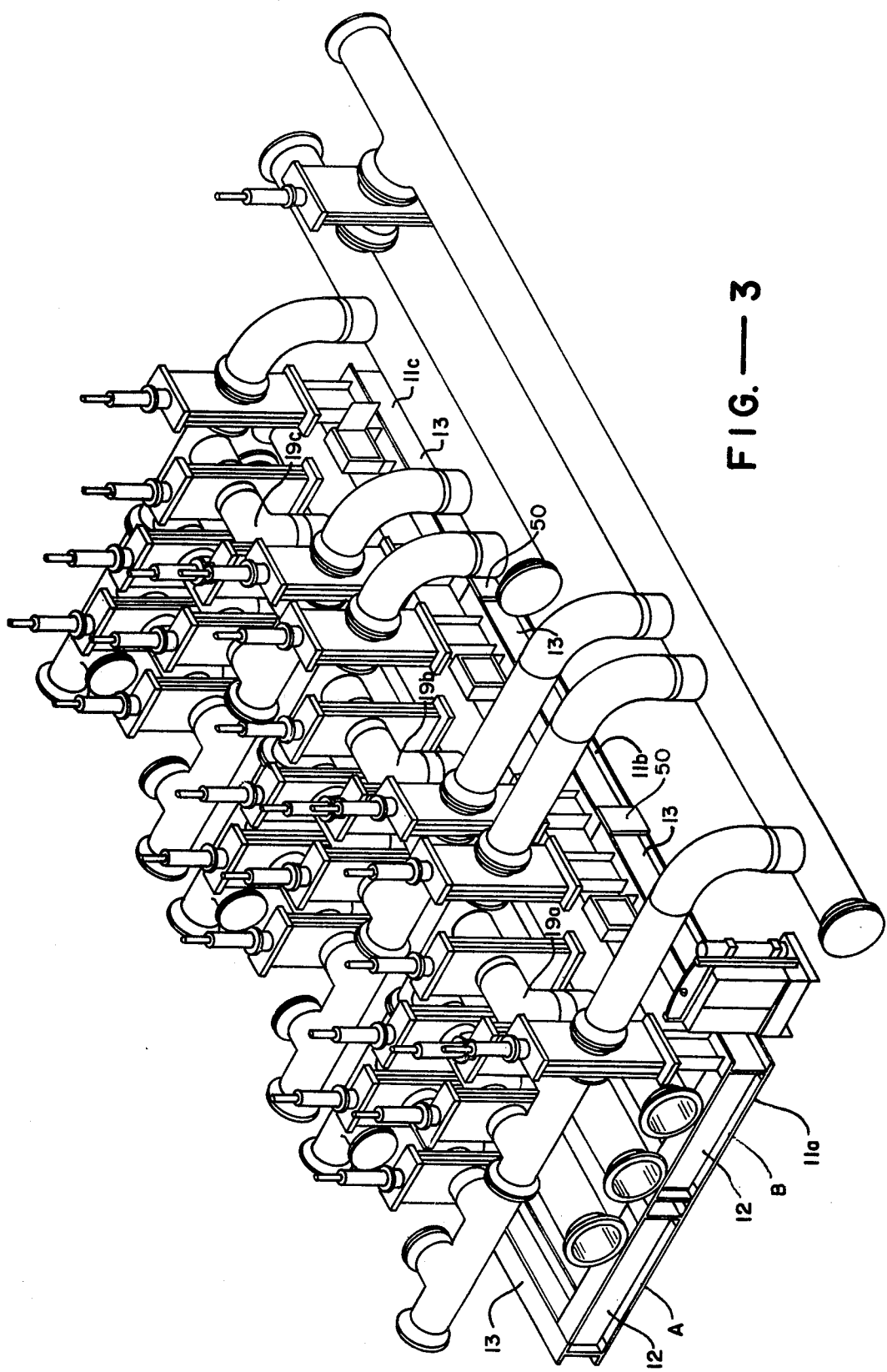
FIG.—3

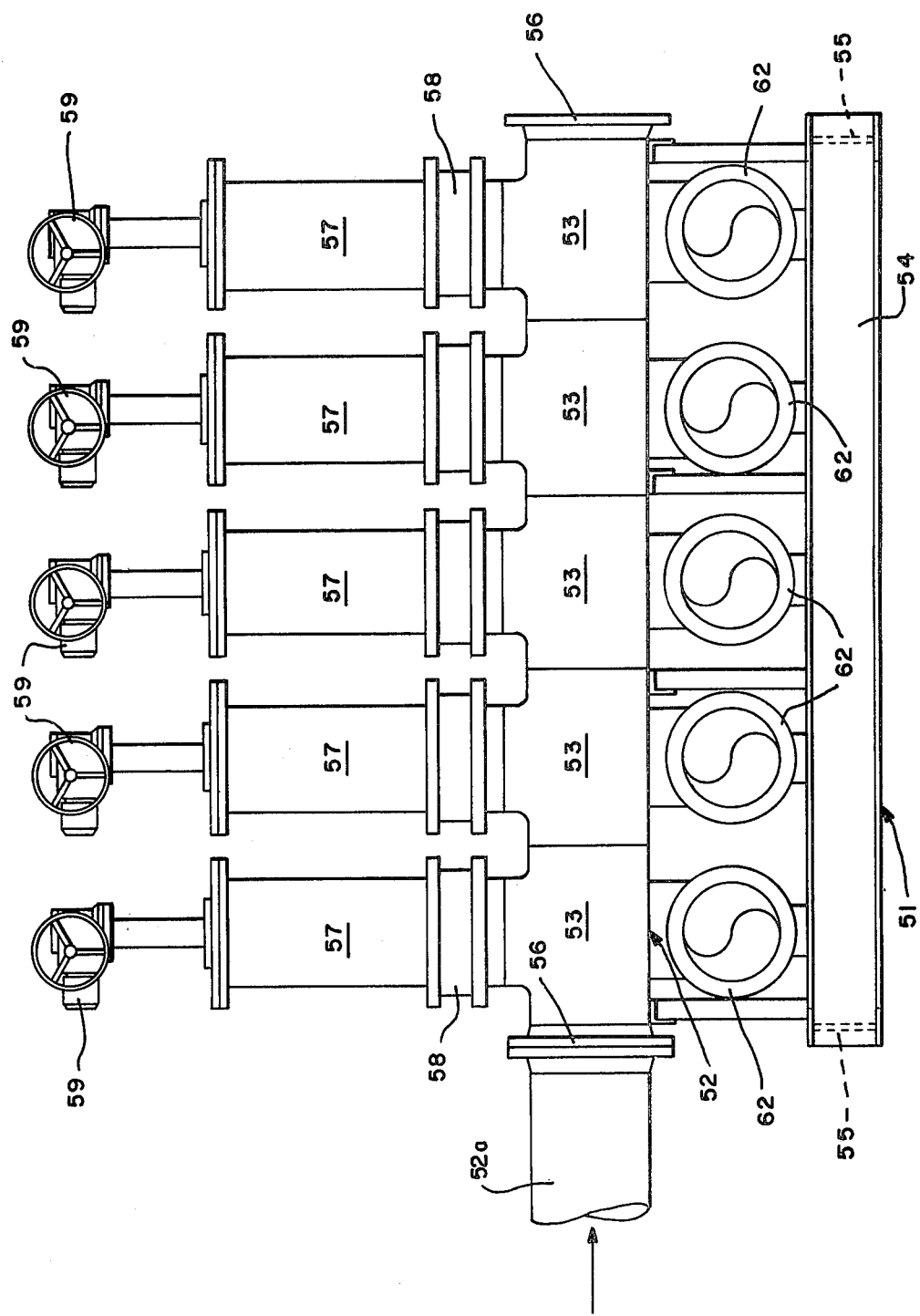
FIG.—4

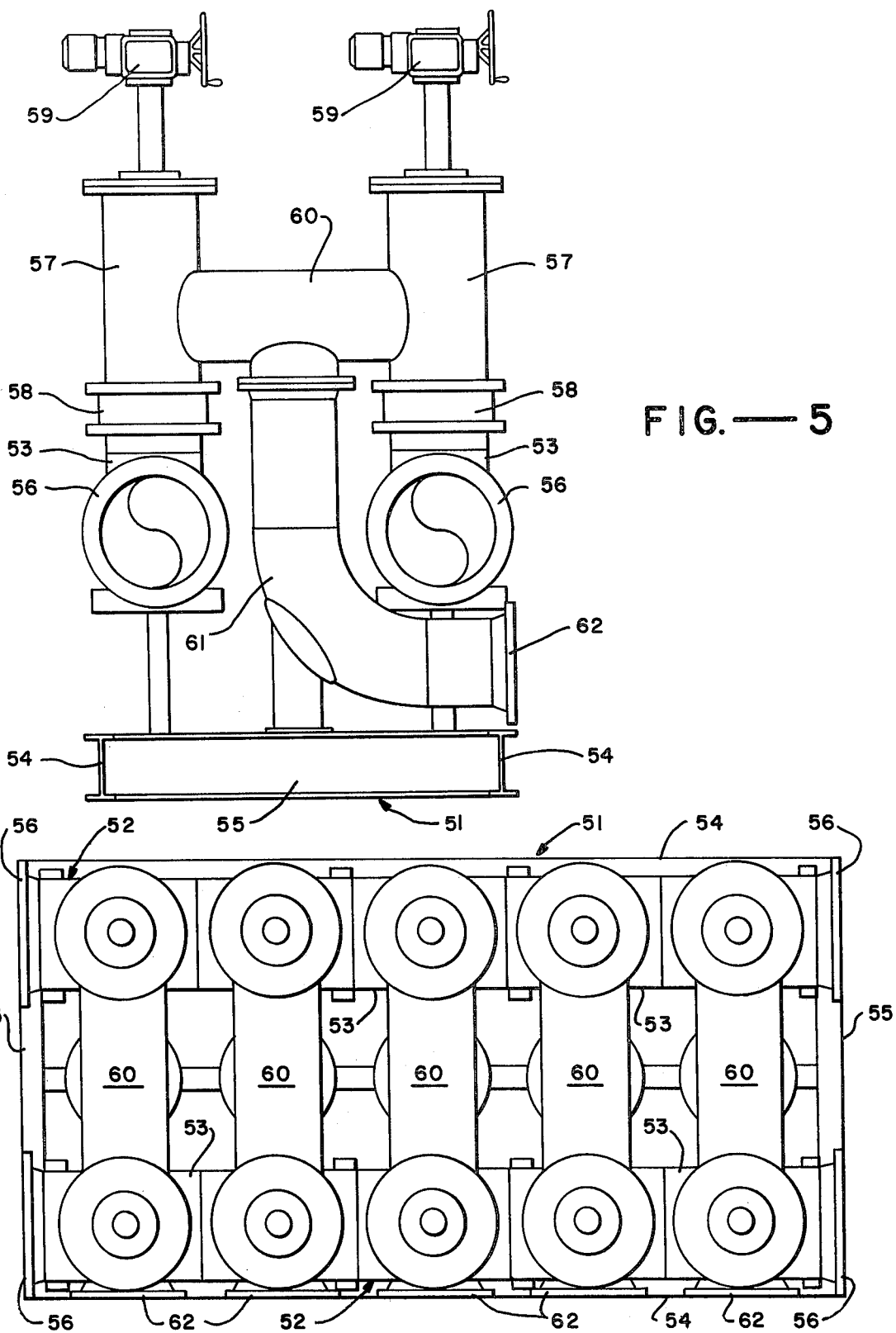

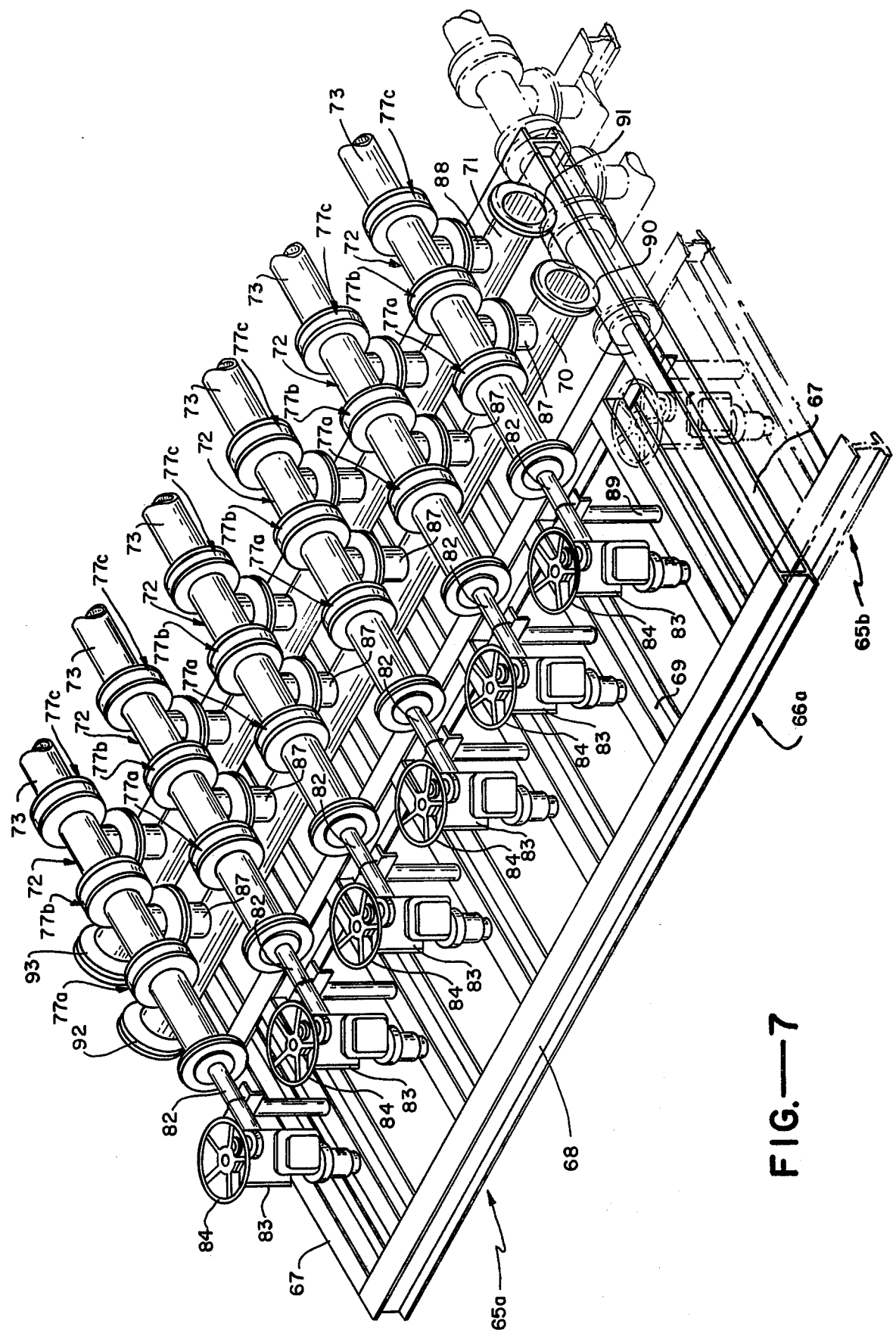
FIG.—7

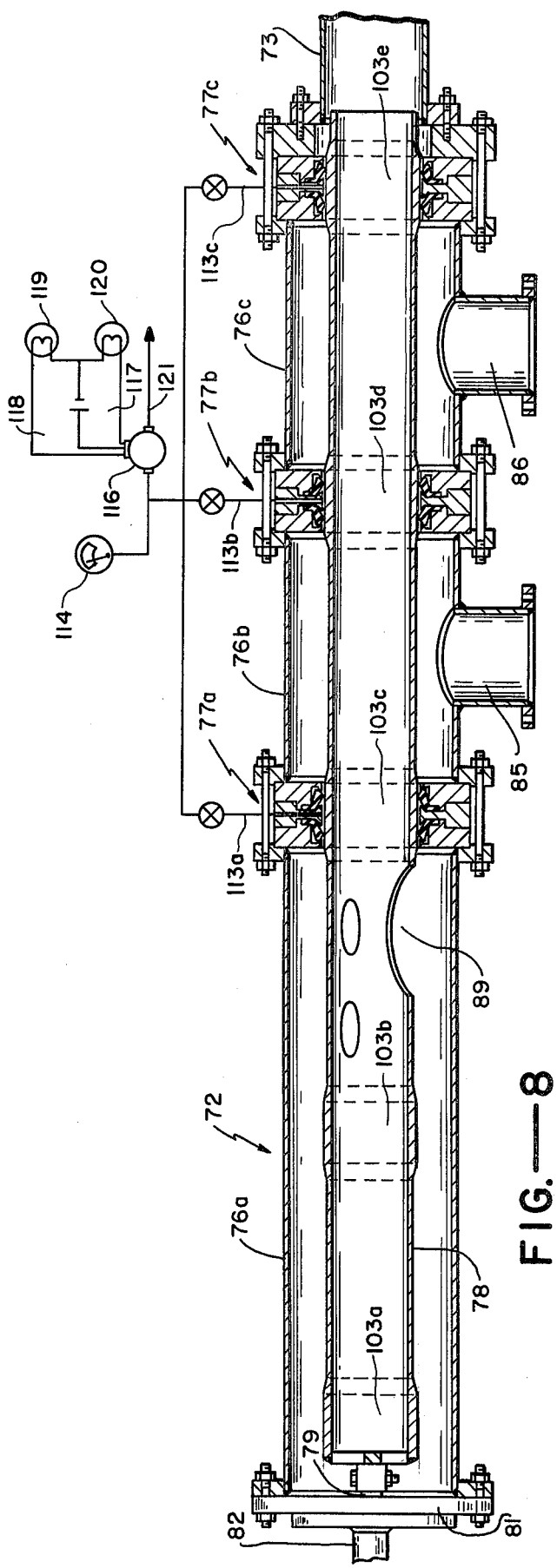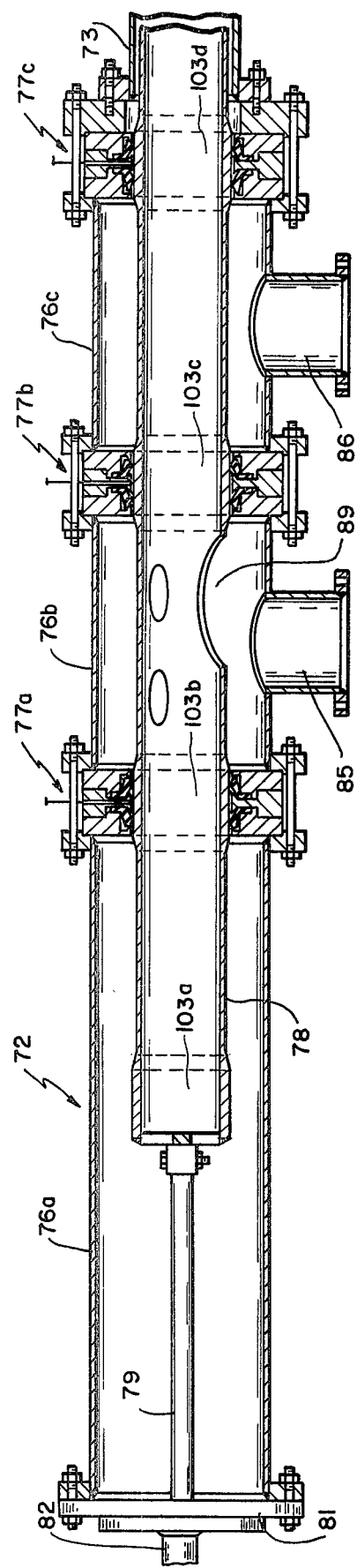
FIG.—8
FIG.—9

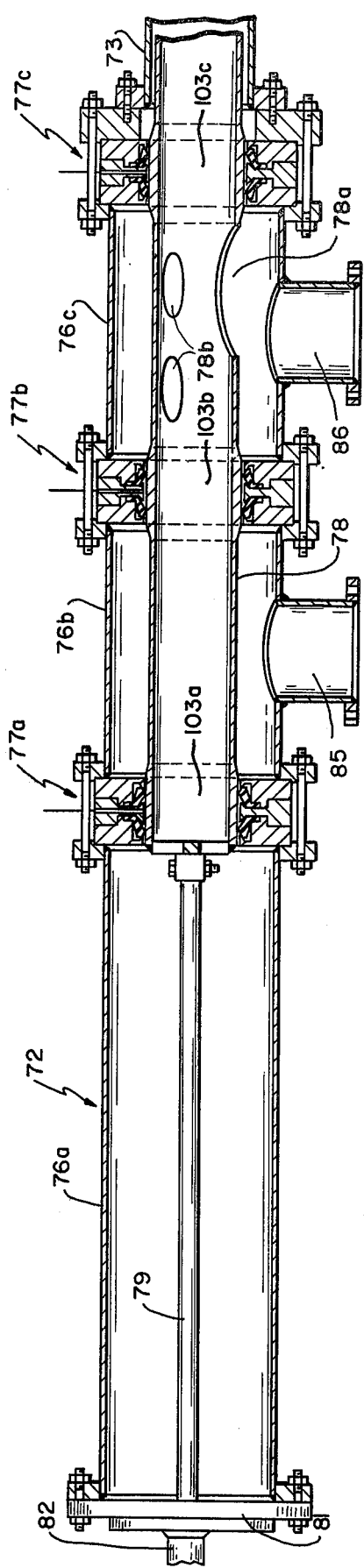
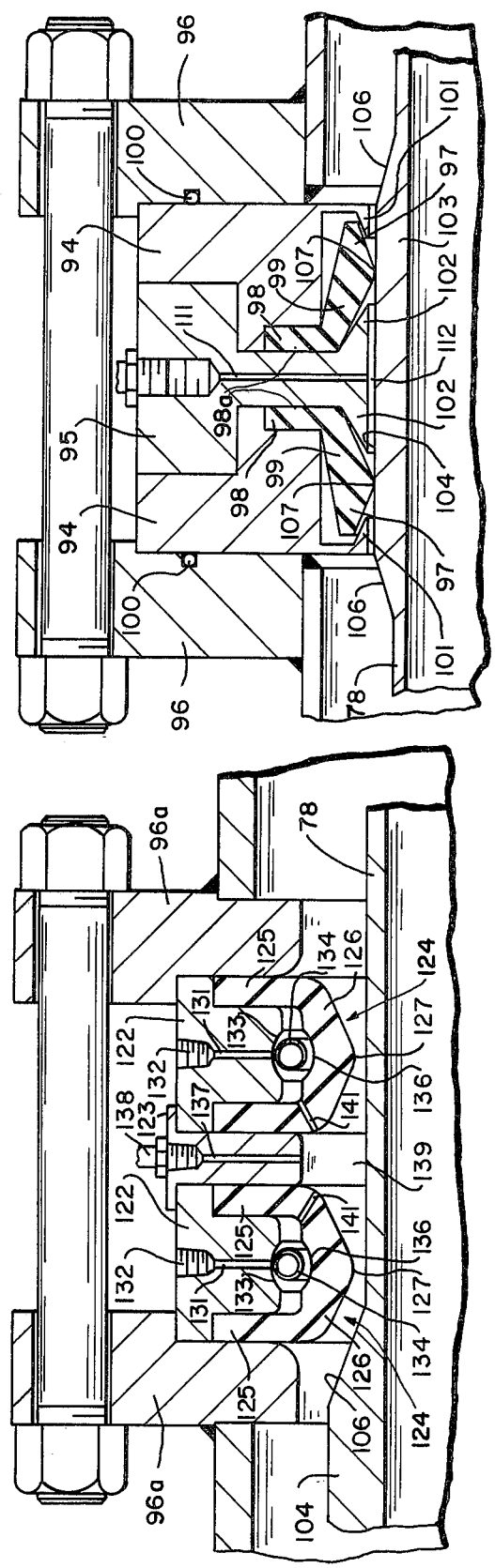
FIG.—10
FIG.—11
FIG.—12

FLOW DISTRIBUTING SYSTEM

CROSS-REFERENCE TO RELATED APPLICATIONS

This application is a continuation-in-part of our co-pending applications Ser. Nos. 695,071 filed June 11, 1976, now abandoned 549,180 filed Feb. 12, 1975, now U.S. Pat. No. 3,978,707 granted Sept. 7, 1976 and 652,998 filed Jan. 28, 1976.

BACKGROUND OF THE INVENTION

This invention relates generally to flow distributing systems for use with tank farms.

In the petroleum industry it is customary to provide a system of flow distributing valves and manifold piping having connections with the several tanks of a tank farm and serving to route liquid to and from the tanks in a selective manner. The construction of such a system is largely a field operation in which the necessary piping components (tees, couplings, bends, etc.) are assembled with the necessary valves in the location desired. Such systems have a number of objectionable features. For example, the field construction methods employed are expensive and require an excessive number of piping components. A system constructed in this manner cannot readily be expanded to accommodate an increased number of inflow pipes or connections to additional storage tanks. In addition, such field construction requires much time and labor to assembly and connect all of the required components, and the resulting system cannot be readily salvaged.

OBJECTS OF THE INVENTION AND SUMMARY

In general, it is an object of the present invention to provide a flow distributing system based on the use of one or more assembly modules. The modules or units are factory assembled, and after transporting to the location desired, they are readily coupled together and to associated piping to produce a complete flow distributing system.

An additional object is to produce an assembly unit or module as described above which is so constructed that more than one unit or module can be readily coupled together with a minimun amount of labor to produce a complete system.

Another object of the invention is to provide an assembly unit or module consisting of a supporting frame or skid together with piping and valves mounted upon the same, the construction being such that when the module is positioned at the desired location, together with one or more additional modules, the piping can be readily aligned and coupled together between the modules, and the frames attached together to form a complete system.

In general, the present invention is a system for selectively distributing flow from one or more fluid sources to any one of a plurality of outlets. The system includes one or more assembly units or modules, each of which consists of a rectangular supporting frame or skid, together with piping extending over the frame and having ends adapted to be coupled to associated inflow piping. Additional piping carried by the frame provides a plurality of outlet ends each adapted to be coupled to associated outflow piping. A plurality of valves are connected between the first mentioned piping and the additional piping. The inlet end or ends of the first named piping are arranged whereby they terminate in a substantially vertical plane coincident with a corresponding edge of the frame. The outlet ends of the additional piping are likewise disposed in a vertical plane coincident with a side edge of the frame. Preferably both ends of each of the first mentioned piping terminate in planes that are parallel and coincident with the corresponding sides of the frame.

Additional objects and features of the invention will appear from the following description in which the preferred embodiments have been set forth in detail in conjunction with the accompanying drawing.

BRIEF DESCRIPTION OF THE DRAWING

FIG. 1 is a plan view illustrating a system in accordance with the present invention.

FIG. 2 is a side view taken along the line 2 — 2 of FIG. 1.

FIG. 3 is a perspective view illustrating the system of FIGS. 1 and 2.

FIG. 4 is a side elevational view of another assembly unit or module incorporating a different type of valve.

FIG. 5 is an end view of the assembly unit shown in FIG. 4.

FIG. 6 is a plan view of the assembly unit shown in FIGS. 4 and 5.

FIG. 7 is a perspctive view illustrating another embodiment.

FIG. 8 is a side elevational view in section illustrating a diverter suitable for use with the assembly of FIG. 7.

FIGS. 9 and 10 are the same as FIG. 8, but show the diverter in two different operating positions.

FIG. 11 is a detail in sectin and on an enlarged scale showing one embodiment of the flow diverter sealing assembly.

FIG. 12 is a detail in section like FIG. 11 but showing another embodiment.

DESCRIPTION OF THE PREFERRED EMBODIMENTS

The embodiment of the invention illustrated in FIGS. 1, 2 and 3 consists of three assembly units or modules 10a, 10b and 10c which are coupled and connected together to form a complete system. Each unit consists of a supporting frame or skid together with an arrangement of pipes and valves carried by the frame and arranged to be coupled with adjacent associated piping. The supporting frames for each of the units 10a, 10b and 10c are designated 11a, 11b and 11c. They may be duplicates, each consisting of structural steel members fabricated by welding, with the complete frame being rectangular in plan. More specifically, each frame can consist of the structural end members 12 which are parallel, together with the side structures 13 that are likewise parallel. Such a frame can serve as a mounting skid and is adapted to be positioned upon a prepared base at the time it is assembled with other units and additional piping. As will be presently explained, in a complete system the separate frames are secured together to form one composite frame.

The pipes carried by each frame for the embodiment shown in FIGS. 1 – 3 include the horizontal parallel pipes 16a, 16b and 16c, and the pipes 17a, 17b and 17c which extend above the pipes 16a, 16b and 16c, and at right angles to the same. Both sets of pipes are suitably supported and secured to the frame. Thus the lower pipes 16a, 16b and 16c are shown supported by webs 18, and the upper pipes 17a, 17b and 17c are supported by connections with the lower pipes. Vertical connecting pipes 19a, 19b and 19c make fluid connections between the upper and lower pipes. Between each of the pipes 19a, 19b and 19c and the adjacent pipes 17a, 17b and 17c, there are valves 21a, 21b and 21c which in this instance are of the gate type. The operators 22a, 22b and 22c for these valves may be of the power type, as for example, pneumatic, hydraulic or electrical, and may be controlled from a remote station. The ends 23a of the pipes 16a are shown provided with coupling flanges and terminate in a vertical plane which is coincident with the edge of the corresponding structural member 12 of the associated frame 11a. The other end 24a of each of the pipes 16a similarly is provided with a coupling flange and terminates in a vertical plane coincident with the corresponding edge of member 12 of the frame 11a. In a similar manner, the pipes 16b and 16c for the modules 10b and 10c have ends designated 23b and 24b and 23c and 24c which terminate in vertical planes coincident with the corresponding edges of the frame.

The pipes 17a, 17b and 17c have ends 26a, 27a, 26b, 27b and 26c and 27c which are provided with coupling flanges in the same manner and which likewise terminate in vertical planes coincident with the corresponding edges of the side frame members 13.

In the construction of such an assembly it will be appreciated that various fabricating techniques may be used. Thus pipe tees can be inserted between the gate valves to facilitate making connection with the underlying pipes of the series 23. Also the pipes of the series 17 can be fabricated by the use of pipe tees, thus facilitating making connection with the gate valves. In this instance the pipes of the series 17 are made in two sections of equal length which are connected together by the couplings 28a, 28b and 28c. Assuming that such couplings are employed, the skid frames may be divided longitudinally into the two sections A and B. Here again the planes of the coupling flanges are vertical and coincident with the corresponding edges of the frame sections A and B.

It will be evident from the above that the complete system of piping and valves described is divided into three assembly modules 10a, 10b and 10c, and that each of these modules in turn may be divided into two modules A and B. The pipe ends 23a are shown connected with the pipes 31, which may connect with various product sources. For example, each of the pipes 31 may receive petroleum product pumped from a tanker. The pipe ends 26a, 26b and 26c are shown connected to the pipes 32 which may lead to the varius storage tanks of a tank farm. The pipe ends 24c may be blanked off, or may be coupled to an additional module.

The pipes 17a, 17b and 17c are shown provided with additional blanked off coupling flanges 29a, 29b and 29c to take care of possible future capacity requirements. Thus if desired at some future date, additional components can be added to provide another connection for an outflow pipe 31.

Some additional piping is shown in FIGS. 1 - 3 which may be used for tank unloading operations. Thus pipes 33 together with valves 34 are shown coupled to the pipe ends 27a. A similar pipe 35 with valve 36 is coupled to one of the ends 27b. The pipes 33 and 35 connect with the header 37, which in turn connects pipe 38 which leads to the suction side of a pump. Additional pipes 41 together with valves 42 are shown coupled to the other pipe end 27b and one of the ends 27c. An additional pipe 43 with valve 44 is coupled to the other end 27c. The pipes 41 and 43 connect with the manifold 46 which connects with pipe 47 leading to the suction side of a pump, and the manifolds 46 and 37 may be interconnected by the bypass valve 48.

The system illustrated in FIGS. 1 - 3 is employed as follows. One or more of the inflow pipes 31 may connect with one or more sources of liquid product. The outlet pipes 32 connect with the several tanks of a tank farm. the valves 34, 36, 42 and 44 normally are closed. By control of the power operators for the gate valves 21a, 21b and 21c, the liquid received through one of the pipes 31 can be routed to any one of the outflow pipes 32. Also if desired, liquid may be received simultaneously from two or more of the inflow pipes 31, and such liquid routed to one or more of the outflow pipes 32. When it is desired to remove product from one or more of the tanks of the tank farm, the pumps connected to one or both of the pipes 38 and 47 are put into operation, and the valves 34, 36, 42 and 44 and 48 positioned whereby liquid is withdrawn from a particular tank, or from more than one tank, and is delivered where desired.

In some instances where the product is being received from a single pipe or source, the pipes 16a may be coupled to a common inflow header.

A feature of the system described above is that the assembly modules 10a, 10b and 10c are factory assembled, together with the skid frames, and are delivered to the location where the system is to be installed. Here the modules are deposited upon a prepared foundation in the manner shown for example in FIGS. 1 - 3, the piping of adjacent modules coupled together, and the coupling made to the inflow and outflow pipes. In making connections between adjacent modules, as for example modules 10a and 10b, the coupling flanges 24a and 24b are readily aligned and bolted together. This necessarily causes the members of the skid frames to be brought into close parallel juxtaposition, as shown in FIG. 2. Coupling means such as plates 50 can then be applied to secure the adjacent frame members rigidly together, and may be secured by bolting or welding. Assuming that all of the modules of the system are secured together in this fashion, then additional pipe connections may be made to the modules to complete the system. If at any time it is desired to increase the capacity of the system, then additional modules can be applied. Also if it is desired to remove the system to another site, the modules can be uncoupled and transported to the new site, where they are assembled in the same fashion.

Another feature of the system is that the individual modules make use of simplified piping arrangements, with a minimum number of expensive components, and the piping to and from the modules can be arranged in an orderly fashion.

Since the modules are factory assembled, the amount of work required when the system is assembled is reduced to a minimum. The operations required to interconnect the modules are relatively simple and likewise, the orderly arrangement of coupling flanges making connections with the associated piping facilitates the work of completing the system.

Another embodiment of the invention is shown in FIGS. 4 - 6 in which valves are used of the so-called diverter type. The module in this instance consists of a skid frame 51 upon which is mounted an arrangement of piping and diverter valves. Thus the two horizontal parallel pipes 52 can be assembled from a plurality of pipe tees 53 that are welded together. The skid frame is made from the side structural members 54, and the end structure members 55. The ends 56 of the pipes 52 terminate in vertical planes coincident with the edges of the structural members 55. One end is shown coupled to the inlet pipe 52a, and the other is adapted for coupling with an adjacent module. The diverter valves 57 are disposed above the horizontal pipes 52 and have the lower ends of their bodies directly coupled to the tees 53.

The diverter valves 57 may be of the type disclosed in U.S. Pat. No. 3,955,796 granted May 11, 1976. The hollow body of such valves includes a sealing assembly 58, and within the body there is a cylindrical closure member carried by an operating rod, the closure member being adapted to be moved within or retracted from the sealing assembly. Each diverter valve is provided with a power operator 59 which can be controlled from a remote station. The lower end of the body of each diverter valve is directly coupled with the underlying pipe tee 53, and the side passages of the diverter valves are interconnected by pipe tees 60. Each pipe tee connects with a bend 61 which has an end 62 adapted to be coupled to outflow piping. FIG. 5 illustrates the ends 62 disposed in vertical planes coincident with the underlying edge of the side frame members 54.

In general, modular assemblies as shown in FIGS. 4 – 6 are used in the same manner as the modular assemblies of FIGS. 1 – 3. Two or more such assemblies may be disposed in end-to-end relationship, with the frames connected and the piping coupled together as described in connection with FIGS. 1 – 3. Also two modules can be disposed side-by-side to provide connections for four inflow pipes as in FIGS. 1 – 3.

The embodiment shown in FIGS. 7 – 10 makes use of a flow diverter of the type disclosed in our copending applications Ser. Nos. 549,180 filed Feb. 12, 1975, and Ser. No. 652,998, filed Jan. 28, 1976, of which this application is a continuation-in-part.

The skid frame 66a in this instance is similar to the skid frames previously described, and consists of the end structural members 68. Additional structural members 69 are shown extending at spaced intervals between the side members 68. It is assumed that the frame 65a and the parts supported by the same form one manifold module which is adjacent and coupled to a second module 65b. The parts supported by the frame include the horizontal parallel pipes 70 and 71 which extend from one end of the skid frame to the other end, and the flow diverters 72 which are disposed at spaced intervals and extend parallel to each other and at right angles to the pipes 70 and 71. The pipes 73 are coupled to the ends of the flow diverters 72 and, for example, may extend to the several tanks of a tank farm.

It is assumed in this instance that the flow diverters are constructed in the manner disclosed in said copending application Ser. No. 652,998. Such a diverter is shown schematically in FIGS. 8, 9 and 10. The body of the diverter consists of aligned pipe sections 76a, 76b and 76c which are coupled together by the assemblies 77a, 77b and 77c which include sealing means. Within the body of the assembly there is a tube 78 which is movable between the operating positions shown in FIGS. 8, 9 and 10, and which extends through the assemblies 77a, 77b and 77c. One end of this tube is attached to the operating rod 79 which extends through a closure 81 which is provided with suitable sealing means to prevent leakage about the rod. The operating rod also extends through a tubular yoke 82 which is mounted upon the end closure 81 and which extends, together with the operating rod 79 to the operator 83 (FIG. 7). This operator may be powered as by an electric motor or by a hydraulic operator and is provided with a hand wheel 84 for emergency use.

The sealing means forming a part of each of the assemblies 77a, 77b and 77c preferably establishes seals on two adjacent annular areas of the tube 78. The left-hand end of the tube 78 is in free communication with the interior of body section 76a. The right-hand end is open and in free communication with the pipe 73 for all operating positions. An intermediate portion of tube 78 is provided with port openings 78a and 78b.

One end of each of the diverter bodies is coupled to the associated pipe 73 by the coupling assembly 77c. The lower side of the diverter body is in communication with the spaced flow passages formed by the short pipe 86, which are coupled to corresponding pipe sections 87 and 88 which extend upwardly from the underlying pipes 70 and 71.

The parts described above are suitably secured and supported on the skid frame 66a, as by standards 89, and support members (not shown) between pipes 70 and 71 and members of the skid frame.

At one end of the module the pipes 70 and 71 are provided with coupling flanges 90 and 91 which are in a vertical plane coincident with the adjacent edge of the frame end member 67. At the other end of the module the pipes 70 and 71 are provided with similarly disposed coupling flanges 92 and 93. In this instance flanges 93 and 94 are shown closed by blind plates, and it is indicated that the coupling flanges 90 and 91 are coupled to the corresponding pipes of an adjacent module. Coupling assemblies 77c are likewise generally coincident with a vertical plane which is also coincident with the adjacent edge of the side frame member 68.

In an actual installation, pipe 70 may connect to the suction side of a pump. Pipe 71 may connect with a source of liquid which is to be supplied to a selected one of the tanks of a tank farm. Pipes 73 may connect to the several tanks of a tank farm to which liquid is to be selectively applied or removed. When a flow diverter is in the position shown in FIG. 8, pipes 70 and 71 are not in communication with either one of the pipes 73 and these pipes do not communicate with each other. When the diverter is positioned as shown in FIG. 9, liquid can be removed from the tank to which this diverter is connected by way of pipe 73, the liquid flowing through the diverter and out through the pipe 70. When the diverter is positioned as shown in FIG. 10, pipe 70 is out of communication with any one of pipes 73, but pipe 71 is placed in communication with the pipe 73 connected to that particular diverter. Thus when the diverter is so positioned, liquid is introduced into the associated tank through the pipe 71 and the corresponding pipe 73.

One suitable construction for each of the sealing assemblies 77a, 77b and 77c is shown in FIG. 11. It consists of the two annular members 94 together with an intermediate annular member 95, the three annular members being disposed between the annular flanges 96. The flanges 96 are secured as by welding to the adjacent ends of the corresponding body sections, and they are clamped together by suitable means such as bolts. The annular cup-shaped sealing members 97 are made of suitable resilient material such as a synthetic rubber or elastomer, and each consists of a base portion 98 formed integral with a rim portion 99. The two rim portions are faced in opposite directions. The base portions 98 are secured between clamping faces formed by the adjacent portions of the annuluses 94 and 95. Sealing means is provided to prevent leakage past the base portions 98. As shown in FIG. 11, the base portion of each sealing member has integral annular beads 98a. When clamped between members 94 and 95 these beads are compressed and flattened against the adjacent clamping faces to form effective seals. Also sealing means 100 of the O-ring type can be provided to prevent leakage between the flanges 96 and the annuluses 94. Annular shrouds 101 are carried by the annuluses 94 and serve to limit or restrain flexing of the rims 97. Additional annular shrouds 102 are carried by the intermediate annulus 95 and serve to limit or restrain flexing of the rims in regions near the base portions 98.

As shown in FIGS. 8 – 10, 11 the portions of the tube 78 indicated at 103a, 103b, 103c and 103d provide cylindrical sealing surfaces 104 of a diameter somewhat greater than the external diameter of the main portion of the tube. At the ends of each cylindrical surface 104 conical shaped surfaces 106 are provided for a purpose to be presently described. The configuration of the rims 97, as shown in section in FIG. 11 is such that areas 107 are provided which are adapted to establish sealing engagement with one of the cylindrical surfaces of the tube portions 103a – 103d. The relaxed diameter of the sealing members when they are disengaged from a cylindrical sealing surface is somewhat less than the diameter of the surfaces 104. Therefore, when the tube is moved to bring a cylindrical sealing surface successively into engagement with the rims of the two sealing members, these rims are flexed and stressed to a larger diameter whereby the areas 107 are urged into sealing engagement with the cooperating cylindrical surface.

As a cylindrical surface is advanced into concentric relationship with an annular sealing assembly, the rim of one of the sealing members, as for example the left hand member of FIG. 11, is first engaged by the tapered surface 106 whereby it is expanded and then engaged with the sealing surface 104a, and thereafter with further movement of the cylindrical sealing surface, the second sealing member is likewise engaged and expanded.

It is desirable for the assemblies 78a, 78b and 78c to be associated with leak detecting means of the type disclosed in U.S. Pat. No. 3,027,285. Thus the intermediate annulus 95 of each of the sealing assemblies is provided with a duct 111 which communicates with the closed space 112 between the rims 97 of the sealing members. As shown in FIG. 8, valve controlled lines 113a, 113b and 113c are shown connected to the ducts 111 of the assemblies and lead to pressure responsive means, such as a pressure gauge 114 and/or the pressure differential switch 116. The differential pressure switch 116 can consist of two closed fluid chambers separated by a movable fluid pressure operated member. A center contact connected to this member operates between two side contacts to control the signalling circuits 117 and 118, which may serve to activate the remote signal lamps 119 and 120. One of the fluid chambers connects with the lines 113a, 113b and 113c, and the other chamber is connected by line 121 to piping (e.g., piping 37) connected to the diverter. When a cylindrical portion of the tube 78 is moved into concentric relation with a sealing assembly, the pressure in space 112 drops below that existing in the body on that side of the assembly toward which the cylindrical portion is moving. As described in said U.S. Pat. No. 3,027,285, this self-induced pressure drop can be used to indicate the establishment of a proper seal, and also to indicate any leakage past either one or both of the sealing members of the assembly. For the two operating positions shown in FIGS. 8 and 9, the indicating means just described can be used to monitor all of the sealing assemblies with respect to leakage. For the position shown in FIG. 10, only the assemblies 77b and 77c are monitored.

Another sealing assembly embodiment is shown in FIG. 12. In this instance the annuluses 122, together with the intermediate annulus 123, are disposed between the coupling annuluses 96a. The sealing members 124 are made of suitable resilient material like that of the sealing members of FIG. 11, and each sealing member consists of side walls 125 joined by the integral wall 126. The wall 126 may have a configuration in section as shown in FIG. 7 to provide an annular area 127 adapted to have sealing engagement with the cylindrical sealing surfaces 104. The side walls 125 are tightly clamped between and sealed with respect to clamping surfaces provided by the annuluses. Here sealing means can be employed as shown in FIG. 11. Each annulus 122 is shown provided with one or more ducts 131 from which air can be bled by removing the plug 132. The inner peripheral surface of each annulus 122 can be provided with a groove 133 which accommodates a spirally wound metal spring 134. The spring is preferably made of flat metal stock, and it is positioned within the associated groove 133 in such a manner that it is stressed circumferentially in compression, thereby retaining its sealed seat within the groove 133. The connecting wall 126 is also provided with a groove 136 whereby when wall 126 is flexed radially to a larger diameter, the spring seats within the groove 136 and further outward expansion then flattens the convolutions of the spring 134 whereby in section they appear to the elliptical.

The intermediate annulus 123 is shown provided with a duct 137 connected to an external line 138. This can be connected to external pressure responsive means for leak detection in the manner explained in connection with FIG. 11. When a cylindrical portion of the pipe is moved into position concentric with the sealing assembly shown in FIG. 12, the sealing members are successively expanded radially and flexed. As a result, a pressure drop occurs in the space 139 between the sealing members, which space is closed by the cylindrical surface 104. It will be noted that space 139 is in free communication with the spaces within the interiors of the sealing members by way of ducts 141.

The embodiment of FIG. 7 has a number of desirable features. It is relatively compact due to the horizontal mounting of the flow diverters 72. The body of each of these diverters serves the purpose of a flow pipe in addition to its function as a part of the flow diverter. The pipes 73 connect directly with one end of each of the flow diverters, which an adjacent horizontal portion of each pipe 73 serving to accommodate a portion of the diverter tube 78 for the positions shown in FIGS. 9 and 10. A minimum number of pipe fittings is required because of the direct vertical connections between the bodies of the diverters and the pipes 70 and 71.

What is claimed is:

1. In a system for selectively distributing flow to and from a plurality of tanks of a tank farm, an assembly module comprising a horizontal rectangular supporting skid frame, a plurality of parallel pipes extending horizontally over and above the frame from one end of the frame to the other, the ends of the pipes being disposed in vertical planes coincident with and above the two corresponding edges of the underlying frame, one end of each pipe being adapted to be coupled to an associated liquid flow pipe, additional pipes carried by the frame and terminating above and along one side of the frame in ends adapted to be coupled to associated flow piping, said last ends being in vertical planes coincident with the corresponding edge of the frame, and a plurality of separate flow controlling means connected between a plurality of the first named pipes and a plurality of said additional pipes, each of said means being connected between one of said first named pipes and one of the additional pipes.

2. A system as in claim 1 including two of said modular assemblies, the adjacent ends of the first named pipes of each assembly being coupled together and the portions of the frames of the two assemblies underlying the coupled ends being secured together.

3. A system as in claim 1 in which the additional pipes include parallel horizontal flow pipes disposed above the first named pipes and in which the flow controlling means are valves located between the additional pipes and connected between the additional pipes, and flow connecting means connected to the valves and to the underlying first named pipes.

4. A system as in claim 1 in which the additional pipes form bodies for the flow controlling means.

5. A system as in claim 4 in which each of the additional pipes which forms a body for flow controlling means has two spaced flow connections to the underlying first named pipes, and one flow connection at one end of the body to said associated flow piping.

* * * * *